Figure 1:
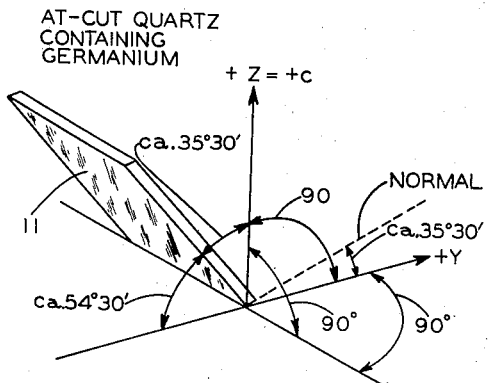

Jan. 27, 1959 F. AUGUSTINE ET AL 2,871,192
QUARTZ CRYSTAL
Filed March 3, 1955 2 Sheets-Sheet 1

INVENTOR.
FRANK AUGUSTINE
ARTHUR D. SCHWOPE
BY
ATTORNEY

Jan. 27, 1959

F. AUGUSTINE ET AL 2,871,192

QUARTZ CRYSTAL

Filed March 3, 1955

2 Sheets-Sheet 2

INVENTOR
FRANK AUGUSTINE
BY ARTHUR D. SCHWOPE

ATTORNEY

United States Patent Office 2,871,192
Patented Jan. 27, 1959

2,871,192

QUARTZ CRYSTAL

Frank Augustine, Cleveland, and Arthur D. Schwope, South Euclid, Ohio, assignors to Clevite Corporation, Cleveland, Ohio, a corporation of Ohio Application March 3, 1955, Serial No. 492,006

8 Claims. (Cl. 252—62.9)

This invention relates to bodies of crystalline quartz, and more particularly to such bodies of the type produced or grown synthetically.

Silica, or silicon dioxide, in the crystalline modification known as quartz exists with the greatest abundance in the earth's crust. Most of the natural quartz occurs in the form of crystallites or very small crystals, as in rocks and sands. In relatively rare instances large single crystals of quartz occur naturally, but the structure of most of these crystals is marred by gross imperfections. Some natural quartz in the form of large single crystals having a relatively high degree of structural perfection is mined for use in the production of piezoelectric resonator plates. Some of the best, radio grade quartz for this purpose comes from Brazil.

Numerous specimens of radio grade quartz have been subjected to spectrographic analysis to determine the incidence of other elements in the quartz. The total amount of impurities ordinarily present, computed as oxides, has been found to be less than 0.04% by weight. The oxides frequently present in amounts over 0.01% by weight are those of aluminum, copper, and lithium. Boron, calcium, magnesium, manganese, sodium, and titanium oxides may be found in lesser amounts. Still smaller amounts of silver, barium, chromium, cesium, potassium, rubidium, and zirconium have been reported in some specimens. It also has been stated that substantial amounts of germanium are present on the earth but camouflaged in quartz and silicates; however, as applied to quartz the amounts of germanium present in terms of parts per million are extremely small, and this element is not mentioned in the spectrographic analyses which include the other elements mentioned hereinabove. Thus, although a significant amount of germanium may be present in the earth's crust in quartz, this is due simply to the extreme abundance of the quartz, rather than to the presence of enough germanium in a given specimen of natural quartz to have any measurable effect whatsoever on the properties of the crystalline material.

The presence of detectable quantities of such elements as aluminum, copper, and lithium in varying proportions in natural quartz may have some effect upon the properties of the natural crystals. Thus different samples of natural quartz have been found to have sufficient differences in the lattice parameters of the crystalline substance to make it impractical to use clear crystalline quartz in the calibration of X-ray diffraction cameras without independent determination of the parameters of the quartz used. There is doubt as to whether or not these small variations in lattice parameters are due entirely to variations in amounts of impurities or are due in part to variations in the physical conditions prevailing during the formation of the quartz by geological processes. Nevertheless, in the applications of natural quartz crystals in the radio industry, natural quartz from different sources has displayed remarkable uniformity as far as all piezoelectric applications are concerned. Consequently, regardless of the source of the radio-grade quartz used, when the crystallographic orientation of a piezoelectric oscillator plate is specified within several minutes of arc no significant variations are encountered in the performance of the resulting oscillator plates.

In specifying the piezoelectric orientation of a quartz resonator plate, such as the so-called AT-cut plate, reference may be had to the conventional designation of crystallographic orientation, following the "Standards on Piezoelectric Crystals, 1949," found in the Proceedings of the I. R. E., vol. 37, No. 12, pages 1378-1395 (December 1949). The crystalline material has three equivalent crystal axes $a_1$, $a_2$, and $a_3$, lying 120° apart in a plane normal to the crystallographic c-axis. In relating the crystalline lattice to a set of right-handed orthogonal axes, the Z-axis is made parallel to the crystallographic c-axis and the X-axis is taken to coincide in direction with one of the crystallographic a-axes, care being taken to follow the convention in choosing the positive directions or senses of the orthogonal axes. The Y-axis then is taken perpendicular to the Z- and X-axes so as to form a right-handed system, whether the quartz crystal lattice happens to be right-handed or left-handed. For simplicity the orthogonal X-, Y-, and Z-axes will be referred to in this specification and in the appended claims as crystallographic axes, although it will be understood that these orthogonal axes are related to the true crystallographic axes only in accordance with the conventions described hereinabove.

Following these conventions, the AT-cut crystal plates of natural quartz are oriented with the normal to the major surfaces of each plate lying within several degrees of a crystallographic YZ-plane. This same normal makes an angle of approximately 35° 10' with the crystallographic Y-axis. The specified angle is positive; according to the convention, a positive angle means rotation counterclockwise as seen looking toward the origin of the axes from the positive end of the axis of rotation, in this case the X-axis. It is customary in the art to maintain the angular relationship within about three minutes of arc of the specified angle for the AT-cut. AT-cut plates made from natural, radio-grade quartz have a well recognized dependence of the natural resonant frequency upon temperature, regardless of the source of the quartz. The AT-cut is one of several cuts oriented to have a very small temperature coefficient of resonant frequency over a maximum range of temperatures. The exact optimum angle between the normal and the Y-axis differs for different lateral dimensions of the plate and for operation at different harmonics of the natural thickness-shear-mode resonant frequency, and variations of 20' or more in either direction from −35° 10' may be found desirable in special cases.

It now has become practicable to grow quartz synthetically on a quartz seed. This synthesis may be carried out at elevated temperatures and pressures using quartz fragments as the source material and an aqueous medium containing sodium carbonate, bicarbonate, or hydroxide as the transfer medium. Methods and apparatus for the efficient growing of single crystals of quartz are described and claimed in Letters Patent of the United States No. 2,675,303, issued April 13, 1954, to A. R. Sobek and D. R. Hale and assigned to the same assignee as is the present invention. Quartz crystals synthesized in such a manner may have lattice parameters differing somewhat from the parameters of a particular specimen of natural quartz. However, the change in the piezoelectric behavior as compared with natural quartz is slight, and the angular orientations of cuts having a negligible temperature coefficient of resonant frequency over a maximum range of temperature are only very slightly different from those of natural quartz, so that the AT-cut of synthetic quartz may be described by specifying an angle close to —35° 15' between the normal to the major surfaces of the plate and the crystallographic axes. This angular orientation, in fact, is very similar to that for the AT-cut in natural quartz, as appears from the fact that the latter angle often is specified also as —35° 15'.

It now has been found possible, however, to modify the composition of quartz single crystals so as to obtain substantially different properties of the crystalline material, including highly useful improvements in the piezoelectric behavior of certain quartz plates.

It is an object of the present invention, therefore, to furnish a new and improved single-crystalline body of alpha quartz which provides significant differences from, and improvements over, the piezoelectric and other properties of natural quartz and of the synthetic quartz of the prior art.

It is another object of the invention to provide synthetic quartz single crystals of modified composition having novel and useful characteristics.

It is a further object of the invention to provide a new and improved single-crystalline quartz material from which may be cut piezoelectric resonator plates having modified and useful properties.

It is yet another object of the invention to provide a new and improved quartz crystal plate of a quartz material modified so that, when cut with an orientation analogous to that of an AT-cut plate of natural quartz, different and improved piezoelectric behavior is obtained.

In accordance with the present invention, a single-crystalline body of alpha quartz contains in solid solution at least 0.05 percent by weight of germanium dioxide. It will be understood that alpha quartz is the quartz modification existing at room temperature and up to about 573° C., at which temperature the alpha-beta transformation from a trigonal to a hexagonal crystal lattice structure occurs.

It will be understood further that, as used in this specification and in the appended claims, the germanium or germanium dioxide is taken to be in solid solution in the single-crystalline body of quartz whenever the crystalline material is homogeneous. It is probable, although such theoretical considerations are not a part of the present invention, that the germanium or germanium dioxide forms an isomorphic series with the silica of the quartz within the limits within which the material can be said to be predominantly quartz. In other words, in quantities up to at least 1.0% by weight of germanium dioxide, and probably in considerably higher quantities as well, it is believed that the germanium atoms in solid solution simply replace certain of the silicon atoms in a random manner throughout the quartz lattice.

In accordance with a feature of the invention, an AT-cut quartz crystal plate contains in solid solution between about 0.05 and about 1.0 percent by weight of germanium dioxide. This aspect of the invention may be described for many conditions by stating that a quartz crystal plate contains an amount of germanium dioxide within the specified range, the normal to the major surfaces of this plate lying approximately in a crystallographic YZ-plane of the crystalline material and making an angle of between 34° and 36° 30' with the crystallographic Y-axis.

In accordance with another feature of the invention, the method of synthesizing germanium-bearing single crystals of quartz comprises supporting at least one quartz crystal seed in a pressure vessel and placing a siliceous supply material, a compound of tetravalent germanium, and an aqueous fluid medium in the pressure vessel. The germanium compound may be introduced into the vessel in solution in the aqueous medium. This fluid medium preferably comprises an aqueous sodium hydroxide solution. The pressure vessel then is sealed and heated to elevated temperatures to cause silica dissolved in the fluid medium to deposit as single-crystalline growth on the seed with simultaneous deposition thereon from the fluid medium of at least 0.05% by weight of germanium, computed in terms of germanium dioxide in the deposited material. Thereafter the vessel is cooled and opened, and the quartz single crystal grown from the seed is recovered.

For a better understanding of the present invention, together with other and further objects thereof, reference is had to the following description taken in connection with the accompanying drawings, and its scope will be pointed out in the appended claims.

Figure 5:
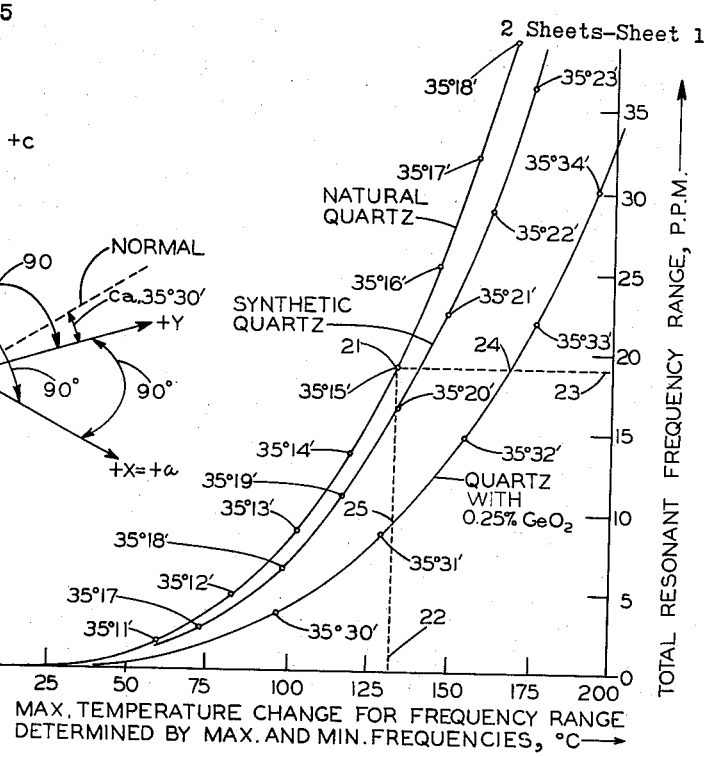
Figure 2:
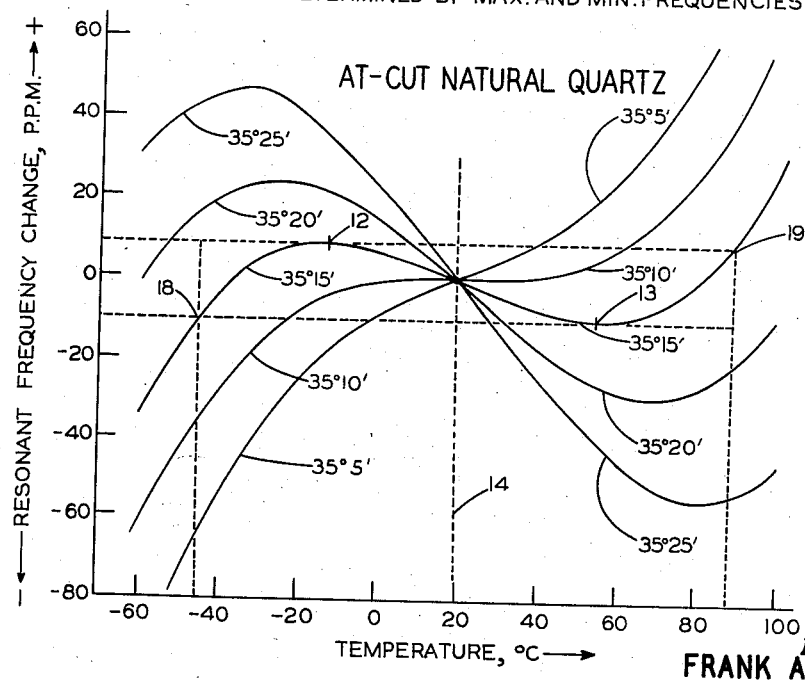
Figure 3:
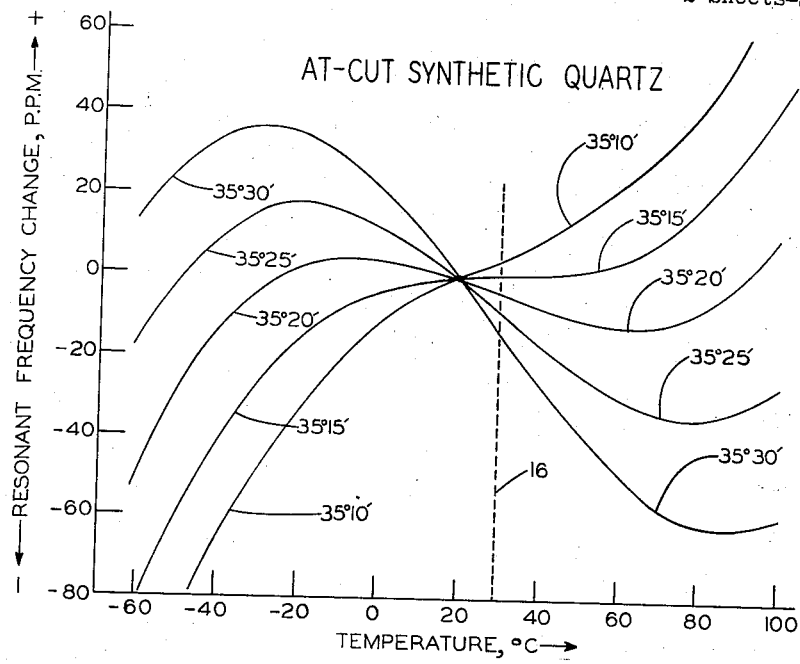
Figure 4:
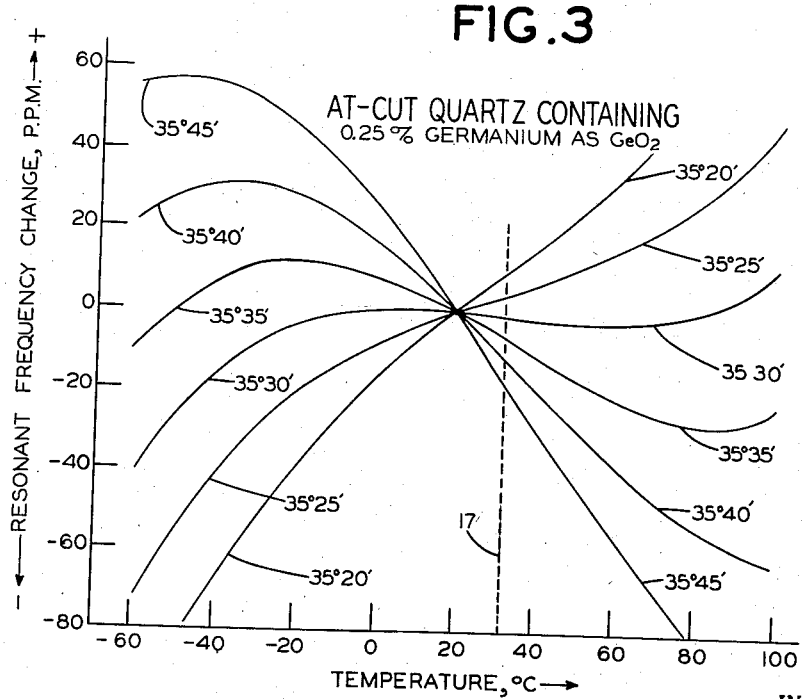

In the drawings, Fig. 1 is a diagram showing a single crystalline body of quartz and representing with reference to a set of orthogonal axes the preferred orientation of such a body, which has the form of a quartz crystal plate embodying the present invention;

Figs. 2, 3, and 4 represent graphically the variations of natural mechanical resonant frequency with temperature variations for certain cuts of quartz crystals, specifically the so-called AT-cut of natural quartz in Fig. 2 and the corresponding cuts of synthetic quartz and of quartz containing germanium in Figs. 3 and 4 respectively, each graph representing the properties of a group of cuts having progressively different crystallographic orientations; and Fig. 5 is a graphical comparison of the total variation of resonant frequency for various AT-cuts of the aforementioned three types of quartz over a temperature range determined by certain extremes of resonant frequency.

Referring now to Fig. 1, there is represented a system of three orthogonal axes X, Y, and Z, in which the XY-plane may be thought of as being horizontal and the Z-axis may be thought of as extending vertically, the positive directions of the three axes being chosen in the conventional manner to determine a right-handed system of coordinate axes. In accordance with the conventional designation of crystallographic orientation for quartz, discussed hereinabove, the positive direction of one of the crystallographic $a$-axes is taken to coincide with the positive direction of the X-axis, and the positive directions of the Z-axis and the crystallographic $c$-axis coincide.

There is represented in Fig. 1 a single-crystalline body 11 which is of alpha quartz. While numerous quartz crystal cuts, such as the so-called GT-cut, the BT- and DT-cuts, and the MT- and NT-cuts, have been found to be useful for various piezoelectric applications, one of the most useful is the so-called AT-cut plate, and the present invention, while not limited to such cuts, will be described with particular reference thereto. Fig. 1 is intended to show the approximate crystallographic orientation of the type of quartz crystal plate conventionally designated as AT-cut quartz, and more specifically such as AT-cut quartz crystal plate 11 containing germanium. The exact crystallographic orientation of such an AT-cut quartz plate should be chosen according to the amount of germanium contained in solid solution in the crystalline material and according to the specific frequency-temperature characteristic desired of the crystal plate. However, for the AT-cut plates containing germanium the angular rotation from the orientation in which the major faces of the plate lie in XZ-planes may be taken as a positive angle of approximately 35° 30', as discussed hereinbelow. Fig. 1 not only indicates this angle in the YZ-plane but also shows the direction in the YZ-plane of the normal to the plate 11, and the normal will be seen to make the same positive angle with the direction of the Y-axis.

In use the plate 11 may have any of a variety of shapes and sizes known to the art. Ordinarily its major faces are provided with electrodes, not shown, forming a capacitor and permitting use of its piezoelectric properties as a resonator element in an oscillator or filter circuit or, with suitable mechanical coupling arrangements, as an electromechanical transducer, in a manner generally familiar to the art.

To aid in understanding the resonant properties of AT-cut quartz, both with and without germanium, the frequency-temperature characteristics at AT-cut natural quartz are presented graphically in Fig. 2. It is noted that natural quartz crystal cuts having an orientation, as represented generally in Fig. 1, with an angle of approximately 35° 10' have a temperature-resonant frequency curve with an inflection point at a temperature in the neighborhood of 20° C. More specifically, this inflection temperature, where the curvature of the graph as viewed from one side changes from concave to convex, varies from 19.2° C. for the 35° 5' cut to 23.1° C. for the 35° 25' cut of natural quartz. Mathematically this inflection temperature is the temperature at which the second derivative of the mathematical relationship expressing frequency as a function of temperature becomes zero. As the orientation angle is increased above 35° 5' to almost exactly 35° 10', an orientation is reached at which the first derivative of the frequency-temperature characteristic becomes zero, and this occurs at the inflection temperature, which is very slightly above 20° C. Continued increase in the orientation angle causes the first derivative to become zero at two temperatures, one below and one above the inflection temperature.

For example, referring to the curve in Fig. 2 for the 35° 15' orientation, the frequency reaches a maximum at the point 12 at a temperature of −12.2° C. and a minimum at the point 13 at a temperature of 54.2°. The resonant frequency change is expressed in terms of deviation in parts per million (p. p. m.), or cycles per megacycle, from a mean frequency which was chosen arbitrarily as the resonant frequency of the plate under consideration at 20° C. A horizontal line through the point 12 shows a deviation of +9.05 p. p. m. at the maximum, and a horizontal line through the point 13 shows a deviation of −9.95 p. p. m. at the minimum. Further increases in the orientation angle cause the maximum frequency to be reached at lower temperatures and the minimum frequency at higher temperatures with increasing deviations of the maximum and minimum from the resonant frequency at the inflection point. Fig. 2 includes curves in 5' steps from 35° 5' to 35° 25'.

The crystal orientation at which the first and second derivatives of the frequency-temperature characteristic become zero at the same temperature may be taken, by an arbitrary convention, as the standard orientation for the AT-cut plate. This cut, which is 35° 10' for natural quartz, gives a curve which is flattest in the temperature regions in the neighborhood of the horizontal portion of the curve. The vertical dashed line 14 in the graph of Fig. 2 represents the inflection temperature for this cut of natural quartz, and this temperature happens to coincide closely with the datum temperature of 20° C. chosen for the frequency measurements. Nevertheless, the other cuts within the range of orientations covered by Fig. 2, and in some cases cuts considerably outside of this range, may be used when minimum frequency deviations within certain specified temperature ranges are desired. For example, if the temperature is to be maintained by thermostatic control within several degrees of 80° C., the minimum temperature variation may be had by the use of the 35° 25' cut, which has a minimum of its frequency-temperature characteristic at about this temperature.

Furthermore, substantial variations in the orientations of the quartz crystal cuts which give curves similar to those represented in Fig. 2 may be encountered under different conditions. In the first place, the data given in the graphs of the drawings represent averages of numerous measurements, and the shape of a curve taken with a given cut from a given body of quartz may well show variations equivalent to that obtained by a variation of several minutes in the orientation of the cut as represented for the average case in the graphs. These variations may be due to a number of causes, such as variations in the content of impurities or in the mechanical and thermal history of the specimen of quartz. Such variations in no way impair the significance of the curves, however, so that it has been found in practice that sufficiently reproducible results may be obtained for practical purposes when the oscillator plates are manufactured with a tolerance of plus or minus three minutes of arc, as mentioned above.

Moreover, the curves in the graphs were taken on plates having square, rectangular, or circular shapes of their major faces and having thicknesses much smaller than the dimensions of their major faces. Thin plates having lengths much longer than their widths deviate slightly from the curves shown. Considerably greater variations occur when the thickness of a plate or disk is increased relative to its width or diameter. The curves of Fig. 2 apply when the ratio of diameter to thickness is greater than about 20. For a diameter-thickness ratio of 10 the orientation for the flattest curve shifts from 35° 10' to about 34° 55', while a further decrease in the diameter-thickness ratio to 7 shifts the orientation to about 34° 40'. On the other hand, operation at harmonics higher than the fundamental, or first harmonic, causes a shift in the opposite direction. For example, for a thin disk the orientation would shift from 35° 10' to about 35° 18' for operation at the third harmonic, while somewhat greater shifts would be found for operation at higher harmonics.

Accordingly, it will be seen that under certain conditions, such as are encountered with relatively thick plates, orientation angles considerably less than 35° 10' may be used, while under other conditions, such as operation at temperatures well above room temperature where a minimum of the frequency-temperature characteristic is desired, orientation angles considerably greater than 35° 10' may be used. All of these cuts properly are considered to be AT-cuts, even though the orientations most usually encountered with natural quartz are in the neighborhood of 35° 10' to 35° 15'.

Very small single crystals of quartz were made synthetically as early as 1900. The synthesis of quartz has been developed recently to the point where a radio grade crystal large enough to be cut into many oscillator plates can be synthesized, using seed plates exposed to siliceous media at elevated temperatures and pressures for periods of time of several weeks or more. Efficient methods and apparatus for growing single crystals of quartz are described and claimed in Letters Patent No. 2,675,303, Sobek and Hale, assigned to the same assignee as is the present application.

In general, synthetic quartz has considerably lower concentrations of impurities than are found in natural quartz, although the impurities in radio grade natural quartz ordinarily are very low. Furthermore, it is quite possible that the conditions under which quartz is produced synthetically differ very considerably from the geological conditions which gave rise to the formation of natural quartz crystals. Both the physical and chemical environments may be varied in the synthesis of quartz. For example, alkaline aqueous fluid media containing sodium hydroxide or sodium carbonate or bicarbonate in varying amounts may be used at temperatures from as low as 275° C. to as high as 450° C. and at pressures from as low as 1,500 p. s. i. to as high as 25,000 p. s. i. These variables probably have some effect, though usually not a major effect, on the properties of the quartz.

Referring now to Fig. 3, there is shown graphically information similar to that given in Fig. 2 for natural quartz but representing measurements made using quartz elements produced synthetically. This quartz, more specifically, was grown from two molar sodium carbonate solutions heated to temperatures of about 350° C. in the neighborhood of the growing seeds and maintained at pressures of about 5,000 p. s. i. Quartz crystals synthesized at temperatures below 300° C. or above 400° C. might have measurably different properties from those of the crystals the characteristics of which are shown in Fig. 3, but these characteristics are considered to be representative of synthetic quartz. The curves in Fig. 3 were obtained by a series of measurements made on AT-cut synthetic quartz plates having orientation angles between 35° 10′ and 35° 30′, the curves shown being for cuts progressively differing in orientation by 5′. Again the datum resonant frequency was taken as that measured at 20° C. The inflection temperature is found to change from 28.3° C. for the 35° 10′ cut to 31.9° C. for the 35° 30′ cut. The frequency-temperature curve develops a zero slope when the orientation angle is increased as far as 35° 16′, giving a curve without maxima or minima and somewhat flatter than that for the 35° 15′ cut whose curve is given in Fig. 3. The second and first derivatives of the frequency-temperature characteristic become zero for the 35° 16′ cut at a temperature just below 29° C., indicated by the dashed vertical line 16 in Fig. 3.

A similar family of curves for AT-cut quartz containing 0.25% germanium computed as $GeO_2$ is presented in Fig. 4. Here again some variation in properties may be expected, depending upon the conditions used in the synthesis of the germanium-bearing quartz. The properties also are rather critically dependent on the concentration of germanium in the crystal. Methods of synthesizing germanium-bearing quartz are discussed hereinbelow.

The curves in Figs. 2–4 were obtained from measurements of the fundamental thickness-shear-mode resonance of disks having diameter-thickness ratios of about 20 to 25 and having thicknesses of about 0.83 mm., giving resonances at about 2 m. c. p. s.

In accordance with the invention, the quartz in the single-crystalline body or crystal plate contains in solid solution at least about 0.05% by weight of germanium dioxide. The designation in this specification and in the appended claims of the germanium content by weight of $GeO_2$ is a matter of convenience only. Quartz containing 0.05% by weight of $GeO_2$ contains 288 germanium atoms per million silicon atoms. Practically speaking, this concentration, equivalent to somewhat less than 300 parts per million, is considered to be the minimum amount of germanium addition which will modify substantially the properties of the crystalline material. Quartz containing in solid solution between about 0.05 and about 1.0 percent by weight of germanium dioxide may be taken as representative of the compositions under discussion, and the quartz having the properties represented in Fig. 4 contained about 0.25% specifically close to 0.24%, by weight of germanium computed as the dioxide. Thus the invention will be discussed with reference to an AT-cut quartz crystal plate containing in solid solution between about 0.05% and about 1.0% by weight of germanium as germanium dioxide, as exemplified by the concentration of approximately 0.25% in the material whose resonant properties are represented in Fig. 4.

The effect of the presence of germanium in the quartz or the crystal lattice parameters is of some interest. Determinations of the $a$ and $c$ lattice parameters of natural quartz and of germanium-free synthetic quartz have failed to disclose any definitive differences between the crystalline substances. Apparent variations as high as about plus or minus 0.005% have been measured, depending on the source of the crystals. Somewhat smaller variations within the same range in the lattice constants of germanium-free synthetic quartz have been measured, apparently dependent upon the growing conditions. However, significant increases in the parameters, particularly the $a$ lattice constant, are found when the quartz contains germanium, although these differences are so small as to be difficult to measure with the usual X-ray diffraction equipment when the germanium dioxide content is no higher than 0.25%.

Returning now to Fig. 4, there are represented the resonance frequency-temperature curves of germanium-bearing AT-cut quartz having orientation angles between 35° 20′ and 35° 45′. The datum resonant frequency again is taken as that measured at 20° C. It will be understood that greater or lesser variations from the properties of quartz substantially free of germanium may be expected, depending upon the amount of germanium in solid solution in the quartz. Thus, as the content of germanium increases, curves of a corresponding shape, but flatter, may be found at increasingly higher orientation angles, the inflection temperatures and temperatures of maximum and minimum resonant frequency becoming increasingly higher for curves of similar shapes. For the quartz containing 0.25% $GeO_2$ the inflection temperature is found to change from 29.6° C. for the 35° 25′ cut to 37.3° for the 35° 45′ cut. The frequency-temperature characteristic develops a zero slope when the orientation angle is increased as far as 35° 29′, giving a relatively flat curve without the slight maximum and minimum values of the resonant frequency evident in the curve for the 35° 30′ cut. The second and first derivatives of the frequency-temperature characteristic become zero for the 35° 29′ cut at a temperature just below 31.5° C., indicated by the dashed vertical line 17 in Fig. 4.

Comparing the curves of Figs. 2, 3, and 4, it will be seen that the synthetic quartz tends to have higher inflection temperatures for cuts giving frequency-temperature curves of corresponding shapes, while the germanium-bearing quartz has still somewhat higher inflection temperatures. The higher temperatures for the flat portions of the curve are advantageous, since the upper temperature limits encountered, for example, in military applications tend to be so high that the natural quartz cuts having the flattest frequency-temperature characteristics can be used only at lower temperatures to avoid rapidly rising resonant frequencies. It is particularly notable that the curves for the germanium-bearing quartz are flatter not only at higher temperatures but also over considerably larger ranges of temperatures. Thus the resonant frequency for the 35° 10′ AT-cut of natural quartz remains constant within plus or minus 5 p. p. m. over a range of 68° C., from −14° to 54°. The corresponding 35° 16′ cut of ordinary synthetic quartz remains within the same limits of frequency variation over a 76° range from −9° to 67°, while the germanium-bearing crystal having the 35° 29′ orientation remains within the same limits of frequency drift over a range of 91° C. from −14° to 77°. These figures represent an improvement of 12% for the synthetic quartz over the natural quartz. However, this temperature range for the germanium-bearing quartz extends from the same minimum temperature to a maximum temperature 23° higher than with natural quartz, so that it shows an improvement of 34% over the natural quartz and a further improvement of 20% over the germanium-free synthetic quartz.

Perhaps a more impressive example of the superiority of the germanium-bearing quartz is found by considering the optimum cut for use in a thermostatically controlled oven for frequency-controlling circuits having negligible drift. A temperature of 75° C. plus or minus 5° C. commonly is specified in such applications. AT-cut crystals having a minimum frequency at or near 75° are used, and inspection of the family of curves of Figs. 2–4 confirms that the cuts should have the orientations of 35° 22′ for natural quartz, 35° 24′ for synthetic quartz, and 35° 33′ for germanium-bearing quartz. Thus in the case of the germanium-bearing quartz, the optimum orientation is not far removed from the 35° 29′ orientation at which the second and first derivatives of the frequency-temperature characteristic become zero at the same temperature, giving a shallow minimum at a temperature just above 76°. Within the frequency range of 70–80° C. the 35° 22′ cut of natural quartz shows a total frequency variation of 0.66 p. p. m., the 35° 24′ cut of synthetic quartz shows a total variation of 0.71 p. p. m., while the 35° 33′ cut of germanium-bearing quartz shows a total variation of 0.35 p. p. m., being only about half that encountered with the natural and sythetic quartz.

Referring again to Fig. 1, the germanium-bearing quartz plate 11 is represented as having one edge in the YZ-plane making a positive angle of approximately 35° 30′ with the Z-axis. As indicated hereinabove, the prototype of the AT-cut germanium-bearing quartz plate may be taken to have such an angle of 35° 29′. This plate may be defined more generally as one of the normal to the major surfaces of which lies in the YZ-plane and makes a positive angle of approximately 35° 30′ with the crystallographic Y-axis. It is noted that the properties of the AT-cut plates are not affected seriously by rotations of as high as several degrees around the aforementioned edge lying in the YZ-plane. Thus the normal to the major surfaces of the plate is required to lie only approximately in a crystallographic YZ-plane of the crystalline material.

For the same reasons given hereinabove in the discussion regarding the permissible variations in the angular orientation of the AT-cut in natural quartz crystal plates, considerable latitude also may be permitted with germanium-bearing quartz plates in the angle between the direction of the normal and the direction of the Y-axis, depending on the thickness of the plate, the desired operating temperatures, etc. Thus the quartz crystal plate of the present invention, containing in solid solution between about 0.05 and 1.0% by weight of germanium dioxide, should make an angle of between 34° and 36° 30′ with the Y-axis, and for most purposes, particularly with $GeO_2$ concentrations between about 0.2% and about 0.5%, this angle will be between 35° 20′ and 35° 50′. As the germanium content is increased from 0.25% toward 1.0% computed as $GeO_2$, the flatter resonance-temperature curves will be found for cuts having an orientation approaching the 36° 30′ cut.

The increased flatness of the frequency-temperature characteristics of the germanium-bearing quartz may be shown graphically in another manner. Referring first to Fig. 2, the curve for the 35° 15′ cut of natural quartz shows a maximum frequency at the point 12 and a minimum frequency at the point 13, representing plus 9.05 p. p. m. and minus 9.95 p. p. m. frequency deviations respectively at −12.2° and 54.2° respectively. The temperature may go well outside of these limits, however, without exceeding the frequency variation represented by the maximum 12 and the minimum 13. Thus the temperature falls to −45.2° before the negative deviation of 9.95 p. p. m. is exceeded at point 18, while the temperature increases to 87.4° before the positive deviation of 9.05 p. p. m. is exceeded at point 19. Thus for a resonant frequency deviation range from −9.95 to 9.05, or a total deviation of 19.0 p. p. m., the 35° 15′ cut of natural quartz may be operated from a temperature of −45.2° to a temperature of 87.4°, or a maximum temperature change of 132.6°. This temperature change is the maximum temperature change for the frequency range determined by the maximum and minimum frequencies at the points 12 and 13 respectively.

Fig. 5 is a plot of the total resonant frequency range in p. p. m. as a function of the parameter just defined, that is, of the maximum temperature change for such a frequency range determined by the maximum and minimum frequencies in the resonance-temperature characteristic. The plots of Fig. 5 cover the AT-cuts which have two temperatures at which the first derivative of this frequency-temperature characteristic is zero. Curves are given for natural quartz, synthetic quartz, and quartz with 0.25% $GeO_2$. These curves represent the loci of points corresponding to different crystallographic orientations. Thus one point on the curve for natural quartz is the point 21, representing the 35° 15′ cut. This point 21 in turn represents the dimensions of a rectangle shown in dashed lines in Fig. 2 and including individually in each of its four sides the points 12, 18, 13, and 19. As described hereinabove this AT-cut plate may be operated over the range of 132.6° C. between the points 18 and 19 in Fig. 2, this total range being indicated by the vertical line 22 in Fig. 5, without exceeding the total resonant frequency range of 19.0 p. p. m. represented by the horizontal line 23 in Fig. 5. Similar data determined for all positive orientations of AT-cut natural quartz plates between 35° 10′ and at least 35° 18′ can be used to generate the curve for natural quartz in Fig. 5.

The same type of data taken for AT-cut synthetic quartz plates having orientation angles increasing from a minimum of slightly less than 35° 16′ to angles of 35° 23′ and more are used to plot the curve for synthetic quartz in Fig. 5. Likewise, the corresponding curve for quartz with 0.25% $GeO_2$ may be plotted from data provided from AT-cut plates, starting with an orientation somewhat less than 35° 29′ and including orientations up to 35° 34′ and higher.

Fig. 5 shows that synthetic quartz represents a slight improvement over natural quartz, but that the germanium-bearing quartz provides operation over much greater temperature ranges without exceeding the same limits of resonant frequency. Thus a cut of the germanium-bearing quartz, indicated by the point 24 on Fig. 5 and having an orientation angle about midway between 35° 32′ and 35° 33′, also has a total resonant frequency range of 19.0 p. p. m. determined by the maximum and minimum frequencies. However, this cut provides operation over a temperature range of 166° C. without exceeding this resonant frequency range. This is an improvement of 25% over the temperature range obtainable with the 35° 15′ cut of natural quartz for the same frequency range.

This 166° range is, perhaps, a range of temperatures larger than usually met with, however, and it is even more interesting to note the total frequency drift for the cut of germanium-bearing quartz over the total temperature range for the 35° 15′ cut of natural quartz, that is, about 132°. This condition is satisfied by a germanium-bearing quartz plate having an orientation angle slightly greater than 35° 31′ and represented by the point 25 on Fig. 5. This AT-cut plate gives a total frequency drift of only about 9.6 p. p. m. over the temperature range determined by the maximum and minimum frequencies. Thus the frequency drift is only just over half of the 19.0 p. p. m. drift obtained with the 35° 15′ cut of natural quartz. This means that an AT-cut plate of the germanium-bearing quartz having the orientation angle slightly greater than 35° 31′ can be operated as the frequency control element in a resonator circuit over a temperateur range from −34° to 98° C., a range of 132°, with only about half the frequency drift obtained in operating the 35° 15′ cut of natural quartz over the temperature range from −45° to 87° C., also a range of 132°. A comparison of the curves in Fig. 5 shows that the total frequency drift for the proper cut of the germanium-bearing quartz, chosen for any desired maximum temperature change determined by the maximum and minimum frequencies, is only about half of the drift encountered with the cut of natural quartz giving the same maximum temperature change. The same comparison between the germanium-bearing quartz and the germanium-free synthetic quartz is found from Fig. 5 to be almost as favorable to the germanium-bearing quartz.

In the method of synthesizing germanium-bearing single crystals of quartz in accordance with the present invention, the aqueous fluid medium preferably comprises a sodium hydroxide solution, since, although germanium-bearing quartz may be grown with the use of aqueous carbonate media, better results have been obtained using alkaline silicate solutions made with sodium hydroxide. Accordingly, in carrying out the method of the invention to synthesize quartz containing about 0.25% germanium by weight computed as $GeO_2$, a vertical cylindrical autoclave having an internal volume of 286 cc. was furnished with seed holders supporting two quartz seeds and a supply material of small pieces of quartz, these solids taking up 56 cc. and leaving a free internal volume of 230 cc. of this free volume, 70% or 161 cc., was filled at room temperature with an aqueous solution of 6.44 grams of NaOH and 8.42 grams of $GeO_2$, making the solution 1.0 molar with respect to sodium hydroxide and 0.5 molar with respect to germanium dioxide. The oxide compound $GeO_2$ is a convenient source of the required tetravalent germanium. It is quite likely that the germanium is present in the nutrient fluid in the form of sodium germanate, $Na_2GeO_2$.

After the autoclave was sealed, it was heated so that the temperature in the neighborhood of the seeds remained during a period of 2½ months at about 345–350° C. A temperature about 35–40° higher was maintained in the lower regions of the autoclave in the neighborhood of the quartz supply material. This resulted in a pressure of between 5,000 and 6,000 p. s. i. within the autoclave. Silica, dissolved by the aqueous fluid medium from the quartz charged into the autoclave, was transferred through the medium and deposited on the growing seeds. Simultaneously relatively small amounts of the germanium or germanium dioxide in the original solution deposited along with the quartz on the growing seeds, about 0.15 gram of the original weight of $GeO_2$ being removed from the aqueous medium in this manner, so that the concentration of both $SiO_2$ and $GeO_2$ remain substantially constant in the nutrient solution during the entire growing period. The combined weight of the two seeds grew from 13.52 grams to 73.36 grams, a total increase of 58.84 grams.

As suggested hereinabove, many variations of the growing procedure may be effected. For example, the temperature of the growing crystals can be raised to 400° C. or higher with pressures of 15,000 p. s. i. or higher. It is noted that in the synthesis of quartz the use of sodium hydroxide solutions ordinarily requires the use of the last-mentioned rather high temperatures and pressures, but that temperatures and pressures somewhat lower than the 350° C. and 5,000 p. s. i. values given in the example hereinabove may be used in growing germanium-bearing quartz (since there are indications that the presence of the germanium makes possible efficient growth at lower temperatures and pressures than may be used practically with ordinary sodium hydroxide media.

While there have been described what at present are considered to be preferred embodiments of the invention, it will be obvious to those skilled in the art that various changes and modifications can be made therein without departing from the invention, and it is claimed, therefore, in the appended claims to cover all such changes and modifications as fall within the true spirit and scope of the invention.

What is claimed is:

1. A single-crystalline body of alpha quartz containing in solid solution at least 0.05 percent by weight of germanium dioxide.

2. A single-crystalline body of alpha quartz containing in solid solution between about 0.05 and about 1.0 percent by weight of germanium dioxide.

3. A single-crystalline body of alpha quartz containing in solid solution about 0.25 percent by weight of germanium dioxide.

4. An AT-cut quartz crystal plate containing in solid solution between about 0.05 and about 1.0 percent by weight of germanium dioxide.

5. A quartz crystal plate containing in solid solution between about 0.05 and about 1.0 percent by weight of germanium dioxide, the normal to the major surfaces of said plate lying approximately in a crystallographic YZ-plane of the crystalline material and making an angle of between 34° and 36° 30' with the crystallographic Y-axis.

6. A quartz crystal plate containing in solid solution between about 0.05 and about 1.0 percent by weight of germanium dioxide, the normal to the major surfaces of said plate lying approximately in a crystallographic YZ-plane of the crystalline material and making an angle of between 35° 20' and 35° 50' with the crystallographic Y-axis.

7. The method of synthesizing germanium-bearing single crystals of quartz, comprising: supporting at least one quartz crystal seed in a pressure vessel; placing a siliceous supply material, a compound of tetravalent germanium, and an aqueous fluid medium capable of dissolving said supply material and germanium compound at elevated temperatures in said pressure vessel; sealing said pressure vessel and heating to elevated temperatures to cause silica dissolved in said fluid medium to deposit as single-crystalline growth on said seed with simultaneous deposition thereon from said fluid medium of at least 0.05 perecent by weight of germanium, computed in terms of germanium dioxide in the deposited material; and thereafter cooling and opening said vessel and recovering the quartz single crystal grown from said seed.

8. The method of synthesizing germanium-bearing single crystals of quartz, comprising: supporting at least one quartz crystal seed in a pressure vessel; placing a siliceous supply material, a compound of tetravalent germanium, and an aqueous fluid medium comprising a sodium hydroxide solution in said pressure vessel; sealing said pressure vessel and heating to elevated temperatures to cause silica dissolved in said fluid medium to deposit as single-crystalline growth on said seed with simultaneous deposition thereon from said fluid medium of at least 0.05 percent by weight of germanium, computed in terms of germanium dioxide in the deposited material; and thereafter cooling and opening said vessel and recovering the quartz single crystal grown from said seed.

References Cited in the file of this patent

UNITED STATES PATENTS

| | | |
|---|---|---|
| 2,343,059 | Hight | Feb. 29, 1944 |
| 2,675,303 | Sobek | Apr. 13, 1954 |
| 2,721,182 | Clement | Oct. 18, 1955 |

OTHER REFERENCES

Bulletin of the Geological Soc. of America, vol. 54, Suppl. 1, Apr. 1943, pp. 1–34.

I. and E. Chem., July 1950, vol. 42, No. 7, pp. 1369–1375.